US008918625B1

(12) United States Patent
O'Bleness et al.

(10) Patent No.: US 8,918,625 B1
(45) Date of Patent: Dec. 23, 2014

(54) SPECULATIVE SCHEDULING OF MEMORY INSTRUCTIONS IN OUT-OF-ORDER PROCESSOR BASED ON ADDRESSING MODE COMPARISON

(75) Inventors: R. Frank O'Bleness, Tempe, AZ (US); Sujat Jamil, Gilbert, AZ (US); Tom Hameenanttila, Phoenix, AZ (US)

(73) Assignee: Marvell International Ltd., Hamilton (BM)

(*) Notice: Subject to any disclaimer, the term of this patent is extended or adjusted under 35 U.S.C. 154(b) by 468 days.

(21) Appl. No.: 13/297,078

(22) Filed: Nov. 15, 2011

Related U.S. Application Data

(60) Provisional application No. 61/417,068, filed on Nov. 24, 2010.

(51) Int. Cl.
```
G06F 9/38        (2006.01)
G06F 9/312       (2006.01)
G06F 9/30        (2006.01)
G06F 9/34        (2006.01)
```

(52) U.S. Cl.
CPC ............ G06F 9/3834 (2013.01); G06F 9/3842 (2013.01); *G06F 9/3838* (2013.01); G06F 9/30043 (2013.01); *G06F 9/34* (2013.01)
USPC ........... 712/216; 712/214; 712/219; 712/225; 712/E9.03; 712/E9.038; 712/E9.048; 712/E9.05

(58) Field of Classification Search
None
See application file for complete search history.

(56) References Cited

U.S. PATENT DOCUMENTS

| | | | |
|---|---|---|---|
| 6,038,657 A | 3/2000 | Favor et al. | |
| 6,212,622 B1* | 4/2001 | Witt | 712/216 |
| 6,463,523 B1* | 10/2002 | Kessler et al. | 712/216 |
| 6,557,095 B1* | 4/2003 | Henstrom | 712/216 |
| 6,694,424 B1 | 2/2004 | Keller et al. | |
| 7,284,102 B2 | 10/2007 | Guthrie et al. | |
| 7,461,238 B2* | 12/2008 | Luick | 712/216 |
| 2005/0149698 A1 | 7/2005 | Yeh et al. | |
| 2006/0095734 A1 | 5/2006 | Filippo et al. | |

* cited by examiner

Primary Examiner — Kenneth Kim

(57) ABSTRACT

A processor that executes instructions out of program order is described. In some implementations, a processor detects whether a second memory operation is dependent on a first memory operation prior to memory address calculation. If the processor detects that the second memory operation is not dependent on the first memory operation, the processor is configured to allow the second memory operation to be scheduled. If the processor detects that the second memory operation is dependent on the first memory operation, the processor is configured to prevent the second memory operation from being scheduled until the first memory operation has been scheduled to reduce the likelihood of having to reexecute the second memory operation.

19 Claims, 5 Drawing Sheets

SPECULATIVE SCHEDULING OF MEMORY INSTRUCTIONS IN OUT-OF-ORDER PROCESSOR BASED ON ADDRESSING MODE COMPARISON

CROSS-REFERENCE TO RELATED APPLICATIONS

This disclosure claims priority to U.S. Provisional Application No. 61/417,068, filed on Nov. 24, 2010, the disclosure of which is incorporated herein by reference in its entirety.

BACKGROUND

The present disclosure relates generally to processors that execute instructions speculatively out of program order, and specifically to scheduling address-dependent memory instructions within such processors.

Processors execute programs which are typically represented as ordered sequences of instructions. A technique for increasing the number of instructions executed per clock cycle involves executing instructions speculatively out of program order. Out of order execution may increase performance of the processor. For example, a processor that executes instructions in order may experience delays when an instruction cannot complete execution because the instruction is waiting on data from memory. In out of order execution, instructions may be executed in a different order than that specified in the program sequence. Thus, other instructions may be executed while an instruction is waiting for data from memory. In an out-of-order processor with multiple execution units, the processor may issue and execute multiple instructions per clock cycle. Out of order execution may allow the execution units to operate in parallel, thereby increasing the number of instructions executed concurrently.

When scheduling instructions for execution, a processor exploiting out of order execution is typically constrained by dependencies between instructions, which dependencies may prohibit their concurrent execution. A second instruction depends upon a first instruction if the first instruction must be executed before the second instruction, e.g., if a result produced by the first instruction is employed as a source operand of the second instruction. In this case, the second instruction is said to have a dependency upon the first instruction. Other types of memory dependencies may exist in an out-of-order processor.

For example, it is desirable to execute younger load memory operations (also referred to as loads) prior to older store memory operations (also referred to as stores) to increase performance of the processor because the loads provide operands for execution of dependent instructions, and thus executing the loads allows for other instructions to be executed. A first operation is "older" than a second operation if the first operation is prior to the second operation in program order. On the other hand, a first operation is "younger" than a second operation if the first operation is subsequent to the second operation in program order. If the younger loads have no dependency on the older stores, the younger loads need not wait for the execution of the older stores. However, in some cases, a load memory operation may depend on an older store memory operation, e.g., the store memory operation updates at least one byte accessed by the load memory operation. In such cases, the load memory operation is incorrectly executed if executed prior to the store memory operation.

The dependency between the load and the store is typically not known until the memory addresses are calculated during execution of the store and the load. Because the memory addresses are not known prior to execution, it is not possible to determine with certainty whether a dependency exists between the load and the store. To avoid incorrectly executing the load prior to the store, a processor may execute the store and the load in program order. However, if there is no actual dependency between the load and the store, performance may be lost due to the delayed execution of the load, which may cause the delayed execution of instructions that are dependent on the load.

Because it is desirable to be as aggressive as possible in scheduling instructions out of order in an attempt to maximize performance, a processor may allow for the younger load to execute prior to the older store with little regard for the actual order of the instructions and then recover from incorrect execution of the load when the processor detects that the load is dependent on the store. For example, the load may be "replayed" by cancelling its current execution and reexecuting it at a later time. Unfortunately, incorrectly executing the load out of order and taking subsequent corrective actions to achieve correct execution may reduce performance due to resources being consumed unnecessarily to execute the load, only to cancel it and wait for subsequent reexecution. Additionally, because the data retrieved by the load may be bypassed to operations dependent on the load, the entire pipeline of speculative instructions must be flushed and reexecuted, which causes a substantial reduction in performance.

SUMMARY

A dependency tracking unit for controlling the scheduling of memory operations in an out-of-order processor is described. During execution of an address-dependent memory operation, a memory address is calculated using an address source register according to an addressing mode (discussed in more detail below) specified by the memory operation. The dependency tracking unit operates on the premise that address-dependent memory operations are likely to reference the same address source register that serves as the base address in the calculation of the associated physical memory address. When the dependency tracking unit detects that a younger memory operation is dependent on an older memory operation due to a base address source register match, it prevents the younger memory operation from being scheduled until the older memory operation has been scheduled. The dependency tracking unit may detect that the younger memory operation is dependent on the older memory operation by, for example, detecting that the younger memory operation references the same base address source register as the older memory operation. In this fashion, the dependency of the younger memory operation upon the older memory operation may be detected prior to the execution of the younger memory operation. Thus, reexecution of the younger memory operation and subsequent speculative memory operations (some of which may be dependent on the younger memory operation) may be avoided, and performance may be increased due to the lack of rescheduling and reexecuting instructions.

In some implementations, the dependency tracking unit may include a tracking structure and tracking circuitry. The tracking structure has a tracking entry that stores a base address source register referenced by a memory operation, such as a store memory operation. When the tracking circuitry receives a base address source register referenced by a younger memory operation, such as a load memory operation, the tracking circuitry determines whether the base address source register referenced by the load is the same as or different from the base address source register stored in the tracking structure, which may be the base address source register referenced by the older store. If the base address source register referenced by the load is different from the base address source register referenced by the store, the load may not be dependent on the store, and the load is dispatched to a schedule queue with a state qualifier that indicates the load is ready to be scheduled. If the base address source register referenced by the load is the same as the base address source register referenced by the store, the load may be dependent on the store, and the load is dispatched to the schedule queue with a state qualifier that indicates the load must wait for the store to be scheduled. Once the store is scheduled, the tracking circuitry may change the state qualifier of the load to indicate that the load is ready to be scheduled.

Details of one or more implementations are set forth in the accompanying drawings and the description below. Other features and advantages may be apparent from the description and drawings, and from the claims.

DESCRIPTION OF DRAWINGS

Like reference symbols in the various drawings indicate like elements.

DETAILED DESCRIPTION

Figure 1:
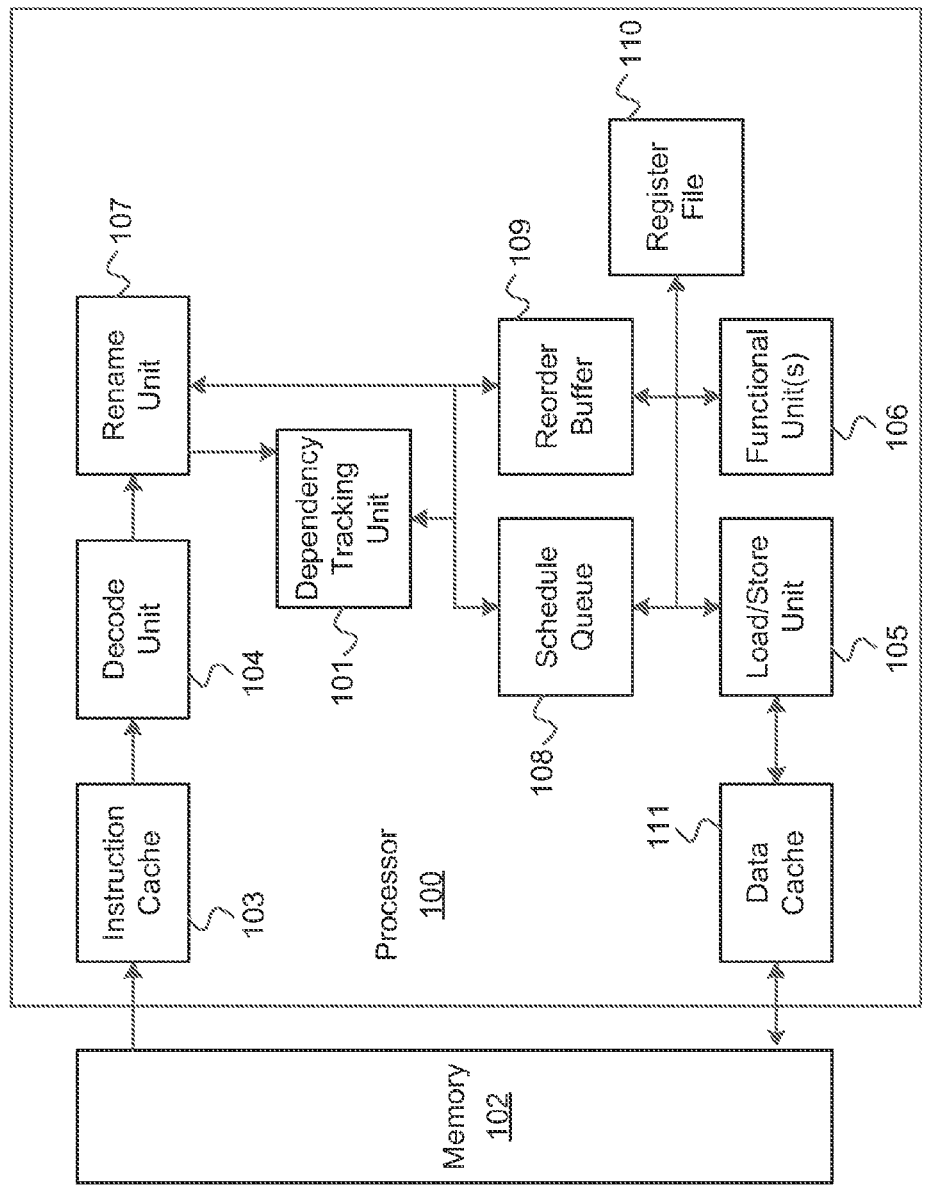
FIG. 1 is a block diagram of an example of a processor with a dependency tracking unit.

Various implementations of the present disclosure are discussed below in conjunction with an example of an out-of-order processor 100, as shown in FIG. 1. The term "processor" as used herein is intended to include any device in which instructions retrieved from a memory or other storage element are executed using one or more execution units. Examples of processors in accordance with the invention may therefore include microprocessors, central processing units (CPUs), very long instruction word (VLIW) processors, single-issue processors, multi-issue processors, digital signal processors, application-specific integrated circuits (ASICs), and other types of data processing devices. It should be understood, however, that the systems and techniques described herein are generally applicable to any processor or processing system in which it is desirable to control scheduling of address-dependent memory operations so as to avoid unnecessary reexecution, resteers, pipe flushes, or other measures taken to recover from incorrectly executing an address-dependent memory operation. Accordingly, FIG. 1 is one specific implementation of an out-of-order processor. Many other processor implementations may exist that include components different than those shown in FIG. 1 and described below.

FIG. 1 is a block diagram of the processor 100 in which a dependency tracking unit 101 may be utilized to control the scheduling of address-dependent memory operations. The processor 100 may be configured to execute instructions stored in memory 102. Instructions are loaded from the memory 102 into an instruction cache 103, which may be a high speed cache memory that temporarily stores instructions prior to sending them to a decode unit 104. These instructions may operate on data stored in the memory 102. Data is loaded from the memory 102 into a data cache 111, which may be a high speed cache memory that temporarily stores data being transferred between the memory 102 and an execution unit, for example, a load/store unit 105.

The decode unit 104 may be configured to receive instructions from the instruction cache 103 and generate information identifying one or more operations corresponding to the instructions. Simple instructions may correspond to a single operation, while more complex instructions may correspond to multiple operations. In some implementations, the decode unit 104 may generate multiple operations per cycle.

The processor 100 includes support for memory operations, such as load memory operations and store memory operations, to facilitate transfer of data between the processor 100 and the memory 102 to which the processor 100 may be coupled (although the transfer may be completed in a data cache 111). A memory operation may specify the transfer of multiple bytes beginning at a memory address. A memory address may be a physical address of a memory location within the memory 102. A load memory operation specifies a transfer of data from the memory 102 to the processor 100. A transfer of data from the memory 102 to the processor 100 may cause a value to be read from a memory location. A store memory operation specifies a transfer of data from the processor 100 to the memory 102. A transfer of data from the processor 100 to the memory 102 may cause a value to be written to a memory location. Memory operations may be an implicit part of an instruction which includes a memory operation, or may be explicit memory instructions. Although the following discusses examples where older memory operations are store operations and younger memory operations are load operations, it should be understood that the invention may be applicable to any sequence of address-dependent memory operations.

A load/store unit 105 may be provided to execute memory operations, in addition to or in lieu of one or more other types of operations. During execution of the memory operation, the load/store unit 105 may calculate the memory address using one or more address operands according to an addressing mode specified by the memory operation. An address operand may be a base register, also referred to here as an address source register or a base address source register, which stores a relative address. Other address operands may include an immediate offset or a register offset that may be combined with the base register to calculate the memory address. For a load operation, the load/store unit 105 may use the address operands to generate a memory address from which data will be read. For a store operation, the load/store unit 105 may use the address operands to generate a memory address to which data will be written or stored.

When a younger load operation specifies the same addressing mode and the same address operands as an older store operation, the younger load is likely to be dependent on the older store. For example, when the load and the store specify a register addressing mode (which may also be referred to as zero-offset immediate addressing mode) and both reference the same base register, the load is likely to be dependent on the store. In another example, when the load and the store specify a scaled register offset addressing mode and both specify the same base register, immediate offset, and register offset, the load is likely to be dependent on the store.

A dependency between a younger load and an older store may be detected prior to the load/store unit 105 executing the load or the store by comparing the address operands of the load and the store. The processor 100 may include a dependency tracking unit 101 configured to detect and track the dependencies of memory operations. The dependency tracking unit 101 may be implemented in a stage of the processor pipeline following a rename unit 107 and configured to receive decoded operations and associated address operands, such as the physical register location (e.g., post-rename, speculative register locations), from the rename unit 107. However, in alternative implementations, the dependency tracking unit 101 may be implemented in the same stage of the processor pipeline as the rename unit 107 and configured to receive decoded operations and the architectural register location from the decode unit 104. The dependency tracking unit 101 may be configured to store information associated with store operations and determine dependencies between load operations and store operations. The dependency tracking unit 101 will be discussed in more detail below.

The dependency tracking unit 101 may dispatch operations to a schedule queue 108, a reorder buffer 109, or both. The schedule queue 108 may be configured to hold operation information for pending operations that are waiting to be issued. The schedule queue 108 may note the dependencies of operations and hold (or retain) an operation until the dependencies noted for that operation are satisfied. The schedule queue 108 may detect when operations are ready for execution and issue ready operations to the execution units. In some implementations, the schedule queue 108 may monitor issued operations and results available in a register file 110 in order to determine when operand values will be available to the execution units. Operations may be issued to the execution units for execution in response to the values of any required operand(s) being made available. Accordingly, the order in which operations are executed may not be the same as the original program order. Other processor implementations may use reservations stations or other scheduling structures as an alternative to the schedule queue 108 shown in FIG. 1.

In some implementations, operations that involve data speculation may remain in the schedule queue 108 until they become non-speculative so that they may be reissued if the data speculation is incorrect. The load/store unit 105 may provide a reexecution indication identifying the operation to be reissued to the schedule queue 108. The schedule queue 108 may responsively reissue operations identified by a reexecution indication. In another implementation, operations remain in the schedule queue 108 until the operation is retired.

The reorder buffer 109 may be configured to store the operations during execution and keep track of the original program order of the operations as they are being issued by the schedule queue 108 out of program order. In some implementations, results of the executed operations are written back to the reorder buffer 109, where the results may be stored until the executed operations are ready for retirement, e.g., into the register file 110. In a specific implementation, the reorder buffer 109 may be a circular buffer containing 64 entries. However, reorder buffer 109 may contain any number of entries in different implementations. Other processor implementations may use memory order buffers (MOB) or other tracking structures as an alternative to the reorder buffer 109 shown in FIG. 1.

The schedule queue 108 and the reorder buffer 109 are coupled to the execution units, e.g., the load/store unit 105 and functional unit(s) 106. The schedule queue 108 supplies operations, register operands, and control signals to the execution units. The schedule queue 108 and the reorder buffer 109 may receive result values and status indications back from the execution units. When an operation is scheduled, the schedule queue 108 may read its source operands from the register file 110, and the source operands may be provided to the execution units. For load or store operations, the source operands include address operands used to generate the address of the memory location accessed by the load or store operation. Address operands of a load or store operation may include register operands provided from the register file 110 as well as offset operands encoded in the load or store operation itself.

Figure 2:
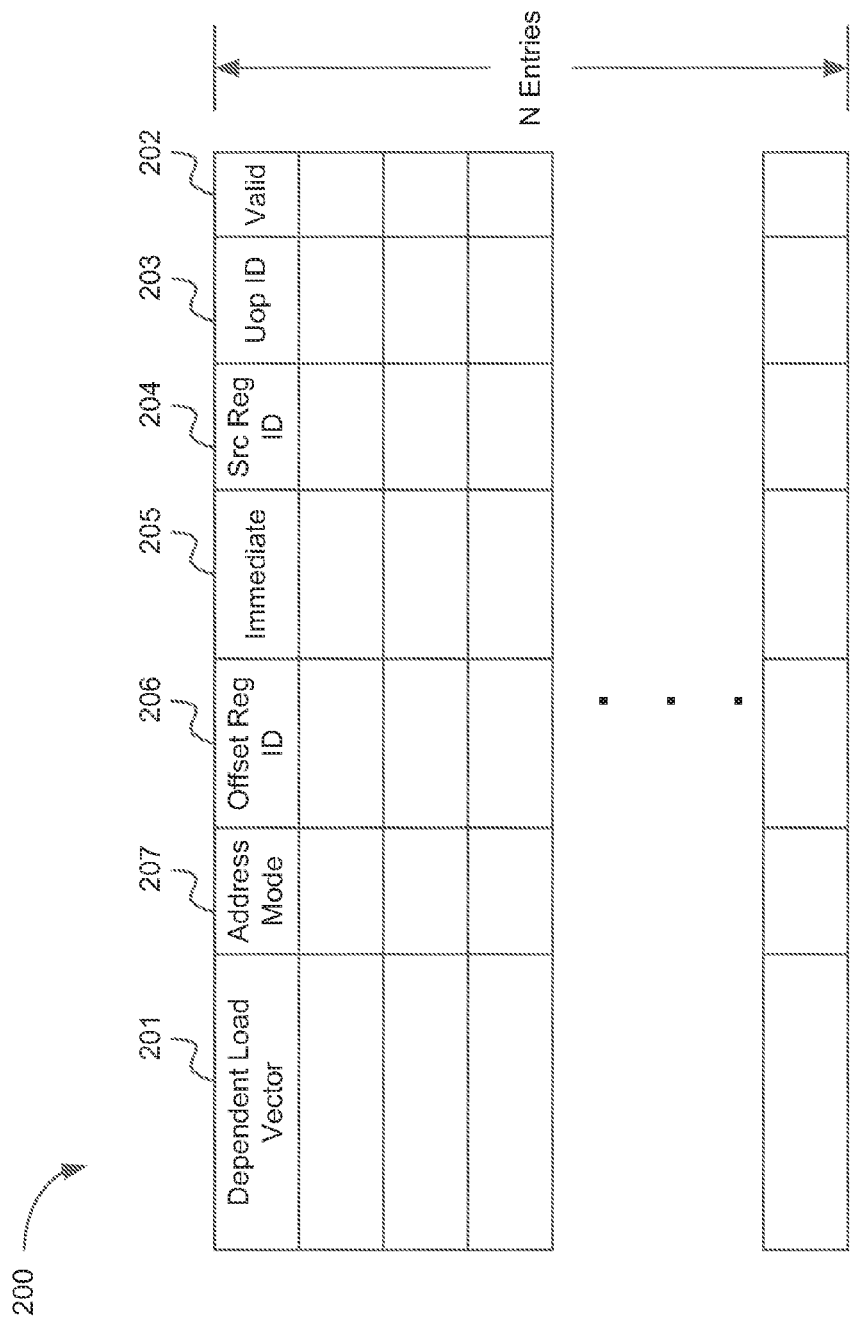
FIG. 2 is an example of a tracking structure of the dependency tracking unit.

The dependency tracking unit 101 may include a dependency tracking structure 200, as shown in FIG. 2, which may be used to enable the comparisons and to track the dependencies of memory operations. The tracking structure 200 can include one or more data structures, such as a queue, a buffer, a stack, a table, a list, an array, etc., that can store information associated with memory operations. In some implementations, the tracking structure 200 may be a discrete tracking structure implemented as a separate component of the processor 100 to manage the dependency tracking. In other implementations, the tracking structure 200 may be a function of existing source-dependency logic already present in the processor 100 that is configured to track dependencies between memory operations.

In some implementations, the tracking structure 200 may include a tracking entry for each store operation that is dispatched to the schedule queue 108, but not yet scheduled for execution by the load/store unit 105. The tracking entry may include information about a store, such as reorder buffer index and base register. For instruction set architectures that support other addressing modes in addition to register addressing mode, the tracking entry may also include immediate offset, register offset, and addressing mode information. The tracking entry may also include a dependent load vector 201 indicating which reorder buffer entries contain younger loads that may be dependent on the store.

To allocate a tracking entry in the tracking structure 200, the processor may assert a valid bit in a valid field 202 of the tracking entry. The assertion of the valid bit indicates that the tracking entry is valid. For example, the tracking entry is valid when the tracking entry is tracking a dispatched store that has not been scheduled. The valid field 202 may be cleared, e.g., by deasserting the valid bit, when the store is scheduled for execution or when the tracking structure 200 is reset.

The tracking entry may include an operation ID (Uop ID) field 203. In a specific implementation, the Uop ID field 203 may be a 6-bit field that contains the reorder buffer (ROB) index of the store associated with the tracking entry. It provides the correlation to resolve dependent loads when the store is scheduled. For example, the ROB index of the store being scheduled may be used to reference the tracking entries in the tracking structure 200 and locate the tracking entry associated with the store. Once the tracking entry is located, the associated dependent load vector 201 may be obtained and used to resolve the dependent loads.

The tracking entry may include a source register ID (Src Reg ID) field 204. The Src Reg ID field 204 may be a 7-bit field that indicates the physical register file (PRF) ID of the base register (which may also be referred to as an address source register) referenced by the store associated with the tracking entry. The base register PRF ID is stored in the tracking entry when the tracking entry is allocated. This PRF ID is compared with the base register PRF ID referenced by a subsequent load to determine if a dependency exists between the older store and the younger load. Specific architectures contain memory operations with pre-indexed or post-indexed addressing modes. The result of the base register PRF ID comparison may be disqualified (or disregarded) when determining if a dependency exists when operating in a pre-indexed or post-indexed addressing mode.

If the instruction set architecture supports immediate offset addressing mode or scaled register offset addressing mode, the tracking entry may include an immediate field 205. The immediate field 205 may be a multi-bit field that denotes the immediate offset specified by the store associated with the tracking entry. The immediate offset is stored in the tracking entry when the tracking entry is allocated. For memory operations with immediate offset or scaled register offset addressing modes, this field is compared with an immediate offset specified by a subsequent load when determining whether a dependency exists between the older store and the younger load. For memory addressing modes that do not include an immediate offset or a register offset, the result of the comparison may be disqualified when determining if a dependency exists.

If the instruction set architecture supports register offset or scaled register offset addressing modes, the tracking entry may include an offset register ID field 206. In a specific implementation, the offset register ID field 206 may be a 7-bit field that indicates the physical register file (PRF) ID of the register containing the offset referenced by the store associated with the tracking entry. The PRF ID of the register containing the address offset is stored in the tracking entry when the tracking entry is allocated. For memory operations with register offset or scaled register offset addressing modes, this field is compared with the PRF ID of the register containing the address offset specified by a subsequent load when determining whether a dependency exists between the older store and the younger load. For memory operations that do not include register offset or scaled register offset addressing modes, the result of the comparison may be disqualified when determining if a dependency exists.

For instruction set architectures that support other addressing modes in addition to register addressing mode, the tracking entry may include an address mode field 207 that captures the addressing mode of a store when the tracking entry is allocated. In a specific implementation, the address mode field 207 may be a 2 to 4-bit field that describes the addressing mode semantics used to calculate the physical memory address of the store associated with the tracking entry. However, the address mode may be represented by various other means. For example, the address mode field 207 may indicate whether the store uses register, immediate offset, register offset, scaled register offset, pre-indexed, or post-indexed addressing mode. The address mode field 207 may also indicate whether the offset is added to or subtracted from the base register.

In some implementations, the bits of the address mode field 207 may be decoded as bit[0] indicating that the immediate field 205 is qualified and bit[1] indicating that the offset register ID field 206 is qualified when determining whether a dependency exists. For example, the bit[1:0] sequence "00" may indicate pre-indexed or post-indexed addressing mode and thus disqualify all comparison results. The sequence "01" may indicate immediate offset addressing mode and disqualify the result of the comparison of the offset register ID field 206. The sequence "10" may indicate register offset addressing mode and disqualify the result of the comparison of the immediate field 205. The sequence "11" may indicate scaled register offset addressing mode, where all comparison results are qualified. Many other scenarios may exist that could be implementation specific. For instance, bit[2] and bit[3] may support special case optimizations where bit[2] indicates register addressing mode and bit[3] differentiates whether the offset is added to (indicated by a "1") or subtracted from (indicated by a "0") from the base register.

The immediate field 205 and the address mode field 207 allow the tracking structure 200 to manage immediate offset addressing mode, by comparing the immediate offset of a new load to the immediate field 205 of the tracking entry in parallel with the comparison of the base register of the new load to the source register ID 103. If the addressing mode of the load indicates that the memory address is to be generated in accordance with an immediate offset addressing mode, the immediate field match and the source register ID match are combined to generate the load dispatch state qualifier, which either prevents the load from scheduling before the store (referred to as a wait state) or allows the load to schedule (referred to as a ready state).

The offset register ID field 206 and the address mode field 207 allow the tracking structure 200 to manage register offset addressing mode, by comparing concurrently the base register and register offset of a new load to the source register ID field 103 and offset register ID field 206, respectively, of the tracking entry. If the addressing mode of the load indicates that the memory address is to be generated in accordance with a register offset addressing mode, the source register ID field match and the offset register ID field match are combined to generate the load dispatch state qualifier.

Similarly, the immediate field 205, the offset register ID field 206, and the address mode field 207 allow the tracking structure 200 to manage scaled register offset addressing mode, by comparing concurrently the base register, immediate offset, and register offset of a new load to the source register ID field 103, immediate field 205, and offset register ID field 206, respectively, of the tracking entry. If the addressing mode of the load indicates that the memory address is to be generated in accordance with a scaled register offset addressing mode, the source register ID field match, the immediate field match, and the offset register ID field match are combined to generate the load dispatch state qualifier. The field matches that are combined to generate the load dispatch state qualifier for various addressing modes are shown in Table 1 below.

TABLE 1

| Addressing Mode | Field Match | | | Load State Qualifier |
|---|---|---|---|---|
| | Src Reg ID | Immediate | Offset Reg ID | |
| Register (zero-offset) | N | N/A | N/A | Ready |
| | Y | | | Wait |
| Immediate Offset | N | N | N/A | Ready |
| | N | Y | | |
| | Y | N | | |
| | Y | Y | | Wait |
| Register Offset | N | N/A | N | Ready |
| | N | | Y | |
| | Y | | N | |
| | Y | | Y | Wait |
| Scaled Register Offset | N | N | N | Ready |
| | N | N | Y | |
| | N | Y | N | |
| | N | Y | Y | |
| | Y | N | N | |
| | Y | N | Y | |
| | Y | Y | N | |
| | Y | Y | Y | Wait |

In a specific implementation, the dependent load vector 201 of the tracking entry may be a 64-bit vector that indicates which reorder buffer entries contain younger loads that are dependent on the store associated with the tracking entry. The dependent load vector 201 contains one bit for each reorder buffer entry. An assertion of a bit in the vector 107 indicates that the reorder buffer entry associated with that bit is tracking a load that is dependent on the store associated with the tracking entry. For example, the reorder buffer entry associated with an asserted bit may be tracking a load that was previously dispatched to the schedule queue 108 with a wait state qualifier and is thus waiting for the store to be scheduled. The bits of the dependent load vector 201 may be either cleared when the tracking entry is allocated or initialized to reflect the dependencies of loads that were dispatched to the schedule queue 108 in the same clock cycle as the store associated with the tracking entry.

The tracking structure 200 may be implemented in content addressable memory (CAM) (also referred to as associative memory), which enables searching of the entire contents of the tracking structure 200 in a single operation to identify a tracking entry, if any, associated with a store upon which the load may be dependent. The tracking structure 200 may allow multiple loads to concurrently compare their registers and offsets with the registers and offsets specified in the tracking entries. For example, if four loads are dispatched in a clock cycle, the tracking structure 200 would allow concurrent register and offset comparisons from all four loads. In this case, the tracking structure 200 may have four CAM ports to enable four concurrent comparisons of each register field and offset field of the tracking entries.

Similarly, the tracking structure 200 enables searching of its entire contents in a single operation to identify a tracking entry associated with a store that is scheduled. In some implementations, one store may be scheduled every clock cycle. In this situation, the tracking structure 200 would need one CAM port for the comparison of the reorder buffer index of the scheduled store with the Uop ID field 203 of the tracking entries. However, there may be other implementations which allow for multiple stores to be scheduled in a clock cycle; in which case, multiple CAM ports may be required for the comparison of multiple reorder buffer indices with the Uop ID field 203 of the tracking entries.

Figure 3:
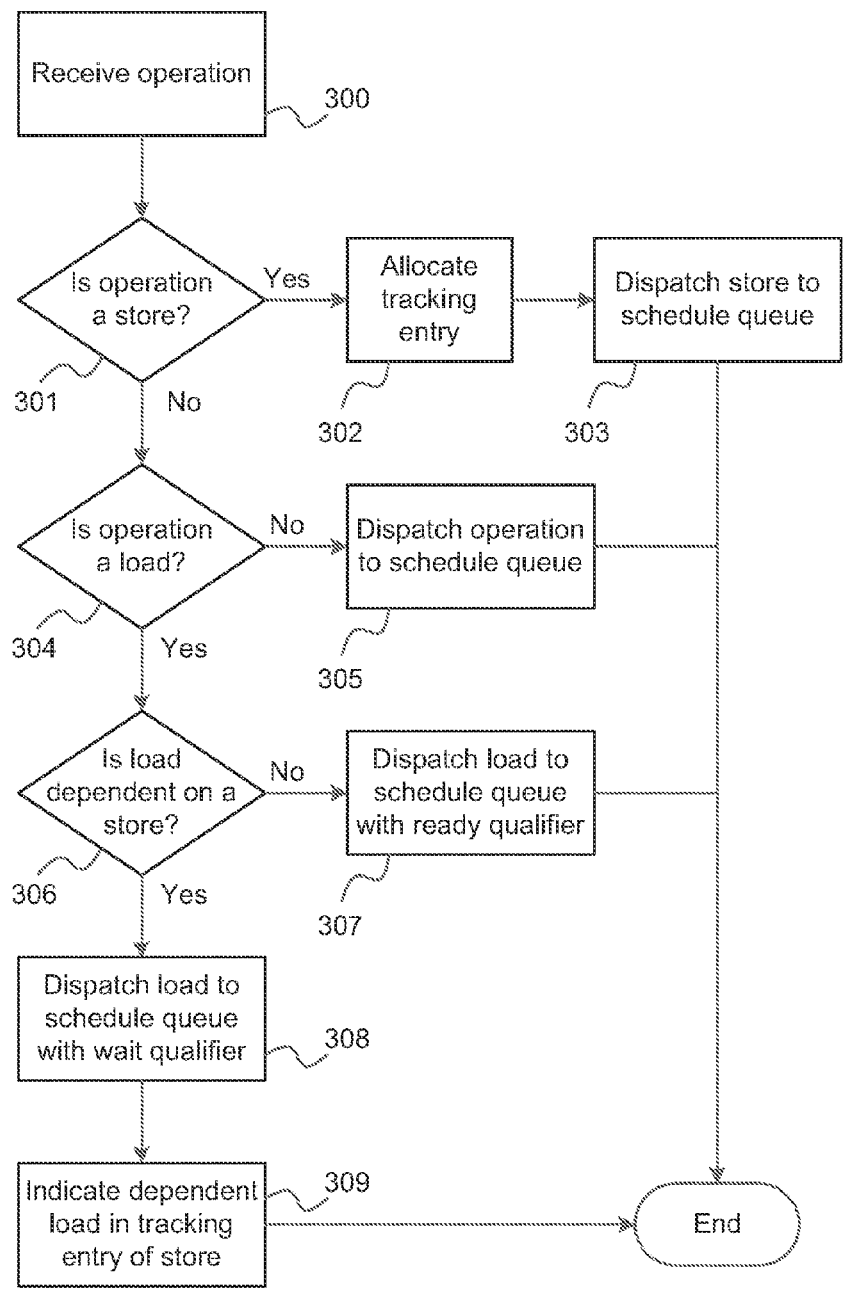
FIG. 3 is a flowchart of examples of operations performed by the dependency tracking unit in response to receiving an operation.

A method for controlling the scheduling of address-dependent memory operations (e.g., in the processor 100 shown in FIG. 1) according to an implementation of the invention will now be described. FIG. 3 is a flowchart showing examples of operations performed by a dependency tracking unit (e.g., dependency tracking unit 101 shown in FIG. 1) of a processor in response to receiving an operation. When the dependency tracking unit receives an operation at 300, the dependency tracking unit determines whether the operation is a store at 301. If the operation is a store, the tracking unit allocates a tracking entry in a tracking structure (e.g., tracking structure 200 shown in FIG. 2) at 302 and dispatches the store to a schedule queue (e.g., schedule queue 108 shown in FIG. 1) at 303. If the operation is not a store, the tracking unit determines whether the operation is a load at 304. If the operation is not a load, the tracking unit dispatches the operation to the schedule queue at 305.

If the operation is a load, the tracking unit determines whether the load is dependent on a store that is being tracked by the tracking structure at 306. Based on the dependency determination, the tracking unit dispatches the load to the schedule queue with a state qualifier that indicates either the load is ready to be scheduled or the load must wait until after the older store has been scheduled. For instance, if the load is not dependent on a store, the tracking unit dispatches the load to the schedule queue with a state qualifier that indicates the load is in a ready state at 307. The ready state allows the load to be scheduled by the schedule queue. If the load is dependent on a store, the tracking unit dispatches the load to the schedule queue with a state qualifier that indicates the load is in a wait state at 308. The wait state prevents the load from being scheduled until the store has been scheduled. The dependency tracking unit indicates the dependency of the load on the store in the tracking entry associated with the store by updating a dependent load vector (e.g., dependent load vector 201 shown in FIG. 2) at 309.

In some implementations, more than one operation may be received and dispatched by the dependency tracking unit per clock cycle. If the operations concurrently received include a load and a store, the dependency tracking unit may determine whether the load is dependent on the store at 306. The dependency tracking unit may determine whether the load is dependent on the store by, for example, comparing the addressing mode and the one or more address operands (e.g., the base register, immediate offset, or register offset) indicated by the load to the addressing mode and the one or more address operands (e.g., the base register, immediate offset, or register offset) indicated by the store, respectively. If the addressing modes and the one or more address operands of the load and the store are the same, the load may be dependent on the store.

If the dependency tracking unit determines that the load may be dependent on the store, the dependency tracking unit may allocate a tracking entry for the store at 302, and initialize the dependent load vector of the tracking entry to indicate the dependency of the load on the store at 309. The dependency tracking unit concurrently dispatches the store and the load to the schedule queue, the load being dispatched with the appropriate state qualifier. Thus, the dependency tracking unit may determine dependencies between the load and concurrently received stores and between the load and older previously received stores tracked by the tracking structure. In this fashion, the dependency tracking unit may resolve dependencies between concurrently received memory operations as well as serially received memory operations.

Figure 4:
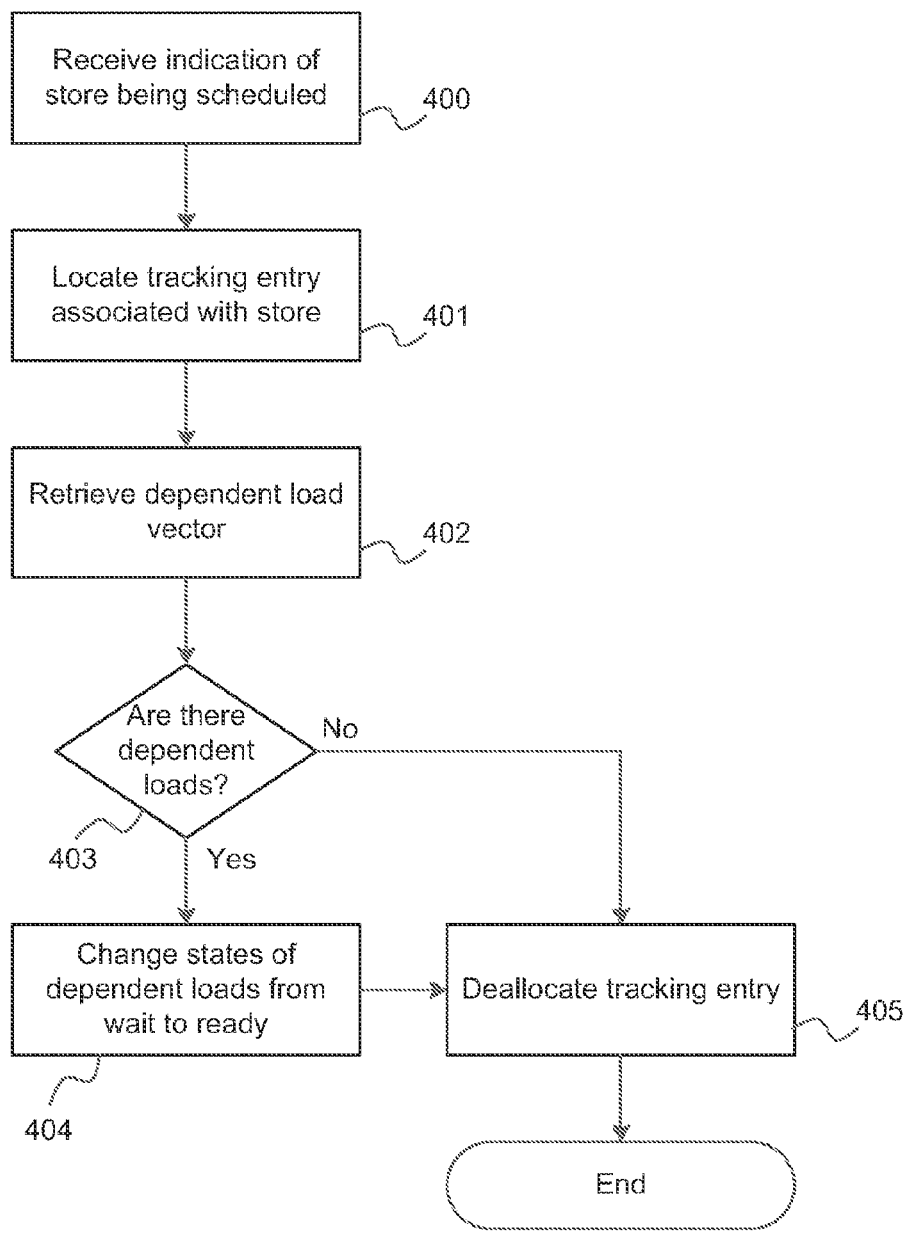
FIG. 4 is a flowchart of examples of operations performed by the dependency tracking unit when a store operation is scheduled.

FIG. 4 is a flowchart showing examples of operations performed by a dependency tracking unit (e.g., the dependency tracking unit 101 shown in FIG. 1) in response to a store being scheduled by a schedule queue (e.g., the schedule queue 108 shown in FIG. 1). When the dependency tracking unit receives an indication that a store is being scheduled at 400, the dependency tracking unit locates a tracking entry in a tracking structure (e.g., the tracking structure 200 shown in FIG. 2) that is associated with the store at 401. To locate the tracking entry, the tracking unit searches a Uop ID field (e.g., the Uop ID field 203 shown in FIG. 2) of each tracking entry to identify a match to the reorder buffer index of the scheduled store. When the tracking entry is located, the tracking unit retrieves its associated dependent load vector at 402 and decodes it to determine whether there are any loads that are dependent on the scheduled store at 403. If there are no dependent loads waiting for the store to be scheduled, the tracking unit deallocates the tracking entry associated with the scheduled store at 405.

If there is at least one dependent load that was waiting for the store to be scheduled, the tracking unit changes the state qualifier of each dependent load in each schedule queue entry associated with each asserted bit of the dependent load vector from the wait state to a ready state at 404, which allows the one or more dependent loads to be scheduled from the schedule queue. The tracking unit deallocates the tracking entry associated with the scheduled store at 405.

Figure 5:
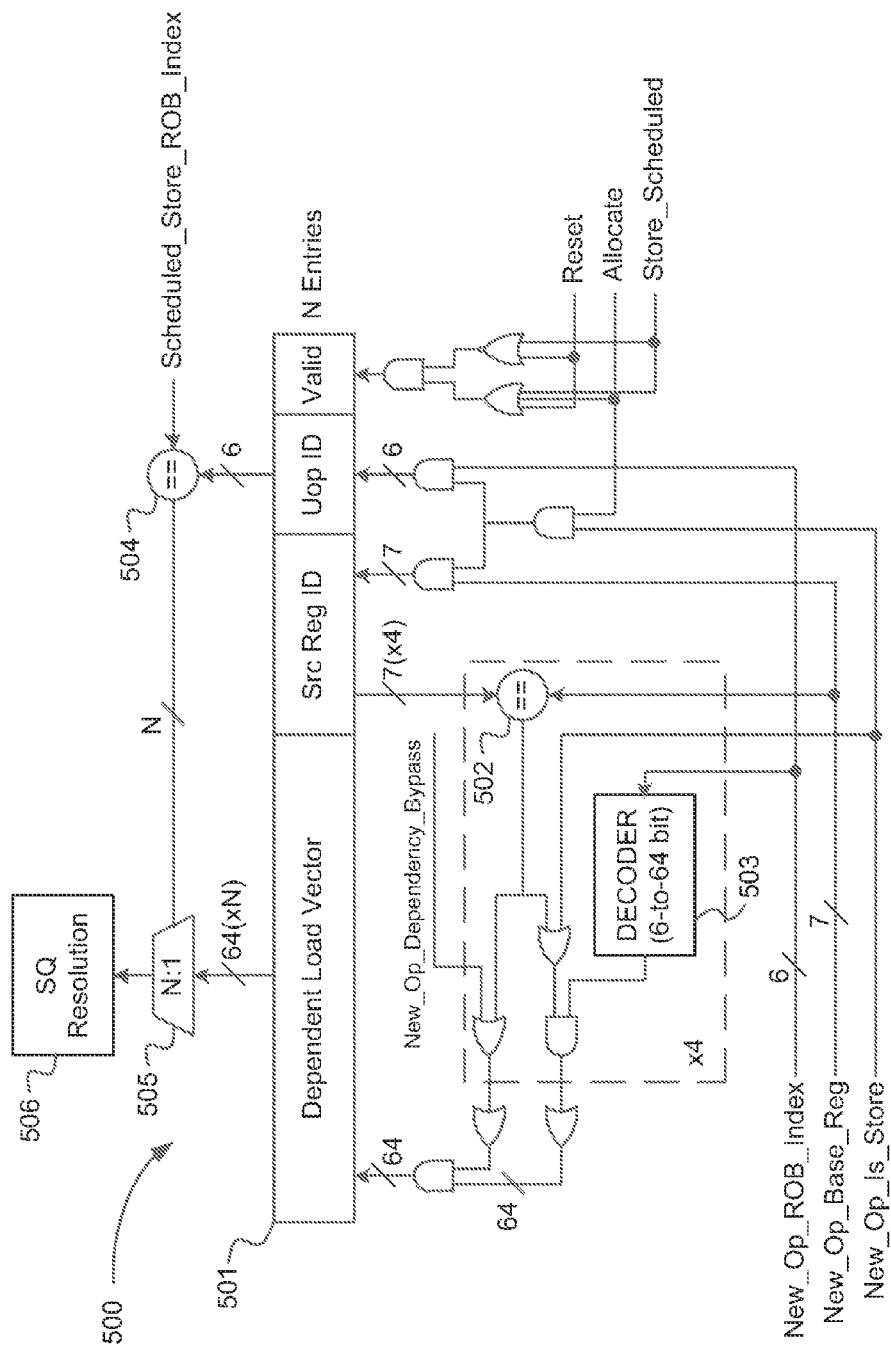
FIG. 5 is a block diagram of an example of a dependency tracking unit.

FIG. 5 is a block diagram of an example of a dependency tracking unit 500 according to a specific implementation of the invention where the addressing mode is simple register addressing mode. As mentioned above, however, dependency tracking may be provided by any logic that is present in the processor and configured to track the dependencies of memory operations. The dependency tracking unit 500 may include the tracking structure 501 and tracking circuitry. The tracking structure 501 may include multiple tracking entries to track multiple store operations. Each entry may include a valid field, a Uop ID field, a Src Reg ID field, and a dependent load vector, which are described above with reference to FIG. 2.

The tracking circuitry of the dependency tracking unit 500 shown in FIG. 5 may include circuitry configured to perform operations in response to receiving a new store operation (as specified by New_Op_Is_Store signal). This may include asserting a valid bit in the valid field to allocate a tracking entry (as specified by the Allocate signal), storing a reorder buffer index (as specified by New_Op_ROB_Index signal) in the Uop ID field, and storing a base register (as specified by New_Op_Base_Reg signal) in the Src Reg ID field.

The tracking circuitry may include circuitry configured to perform operations in response to receiving a new load operation. The tracking circuitry may include a CAM port 502 for comparing a base register of the new load operation (as specified by New_Op_Base_Reg signal) with the Src Reg ID fields of the tracking entries. If multiple load operations can be concurrently received and dispatched, the tracking circuitry may include multiple CAM ports 502 to compare the base register of each new load with the Src Reg ID fields of the tracking entries. For example, FIG. 5 shows the tracking circuitry as including four CAM ports 502 to compare the base register of four concurrently received load operations with the Src Reg ID field of each tracking entry. However, the tracking circuitry may include any number CAM ports to support the receipt and dispatch of any number of new load operations in different implementations.

In the example implementation, the tracking circuitry may include a 6-to-64 bit decoder 503 to decode the reorder buffer index of the new load operation (as specified by New_Op_ROB_Index signal) into a multi-bit dependent load vector with the bit(s) corresponding to the reorder buffer entry(s) asserted. If multiple load operations can be concurrently dispatched, the tracking circuitry may include multiple decoders 503 to decode the reorder buffer index of each new load operation into a dependent load vector. For example, FIG. 5 shows the tracking circuitry as including four decoders to decode the reorder buffer index of four concurrently dispatched load operations. Accordingly, the tracking circuitry may include circuitry configured to update the dependent load vector of the tracking entry with the asserted bit in response to a Src Reg ID field match.

The tracking circuitry may include circuitry configured to perform operations in response to a store operation being scheduled. This may include a CAM port 504 for comparing a reorder buffer index of the scheduled store (as specified by Scheduled_Store_ROB_Index signal) with the Uop ID field of each tracking entry to locate the tracking entry associated with the scheduled store. An N:1 multiplexer 505 may be used to select the dependent load vector that corresponds with the tracking entry associated with the scheduled store. The dependent load vector may then be provided to a schedule queue (SQ) resolution circuitry 506 to change the state qualifier of each dependent load specified by the dependent load vector from a wait state to a ready state. The tracking circuitry may include circuitry configured to deassert the valid bit in the valid field when the store is scheduled (as specified by the Store_Scheduled signal) to deallocate the tracking entry.

Although the dependency tracking unit as shown in FIG. 5 manages memory operations that use register addressing mode, the dependency tracking unit may be generalized to manage memory operations that use any number of addressing modes. In some implementations, the Src Reg ID datapath may also include components, such as CAM ports 502, for comparisons of the Immediate field and the Offset Reg ID field with the immediate offset and register offset, respectively, of a load operation. Each of the three field matches (Src Reg ID field match, Immediate field match, and Offset Reg ID field match) may be individually qualified by the appropriate addressing mode as indicated by the Address Mode field of the tracking entry and addressing mode of the load operation, as indicated above in Table 1. Specifically, the Src Reg ID field match is qualified by any addressing mode except pre-indexed or post-indexed addressing modes (e.g., when the Address Mode field bit[1:0] sequence is not "00"). The Immediate field match is qualified by an immediate offset or a scaled register offset addressing modes (e.g., the Address Mode field bit[1:0] sequence of "x1"). Similarly, the Offset Reg ID field match is qualified by a register offset or scaled register offset addressing mode (e.g., the Address Mode field bit[1:0] sequence of "1x").

Note that stores specifying pre-indexed or post-indexed addressing modes may be allocated a tracking entry, even though all field matches may be disqualified when determining whether a load is dependent on the store. The field matches may be disqualified due to a subsequent load's memory address having already been altered despite accessing the same base register as an older store. In another implementation, such stores may bypass the dependency tracking unit 500 and may be dispatched directly to a schedule queue. In yet another implementation, instead of capturing the source base register of the store and comparing the Src Reg ID field of the tracking entries, the dependency tracking unit 500 may capture the associated destination base register pre-indexed or post-indexed in the rename logic. Other operations performed by the dependency tracking unit 500 may remain the same, except that the destination base register match may be qualified by index-based addressing modes.

A few implementations have been described in detail above, and various modifications are possible. The described systems and techniques may be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. A computer-readable medium may be a memory device, a storage device, a machine-readable storage substrate, or other physical, machine-readable medium, or a combination of one or more of them.

While this disclosure contains many specifics, these should not be construed as limitations on the scope of what may be claimed, but rather as descriptions of features that may be specific to particular implementations. It will be understood that various modifications may be made without departing from the spirit and scope of the invention. For example, the steps of the methods described above can be performed in a different order and still achieve desirable results. Accordingly, other implementations are within the scope of the following claims.

What is claimed is:

1. A method comprising:
   receiving a first addressing mode referenced by a first memory operation;

receiving a second addressing mode referenced by a second memory operation, wherein the first memory operation precedes the second memory operation within a program sequence;

detecting that the second memory operation of the program sequence is dependent on the first memory operation of the program sequence including determining that the second addressing mode is the same as the first addressing mode; and preventing the second memory operation from being scheduled for execution until the first memory operation has been scheduled for execution to reduce a likelihood of having to reexecute the second memory operation.

2. The method of claim 1, wherein the first memory operation causes a value to be written to a memory location, and the second memory operation causes the value to be read from the memory location.

3. The method of claim 1, wherein detecting that the second memory operation is dependent on the first memory operation comprises:

receiving a first base address source register referenced by the first memory operation;

receiving a second base address source register referenced by the second memory operation;

comparing the second base address source register to the first base address source register; and determining that the second base address source register is the same as the first base address source register.

4. The method of claim 3, wherein detecting that the second memory operation is dependent on the first memory operation further comprises:

receiving a first immediate offset referenced by the first memory operation;

receiving a second immediate offset referenced by the second memory operation;

comparing the second immediate offset to the first immediate offset; and determining that the second immediate offset is the same as the first immediate offset.

5. The method of claim 3, wherein detecting that the second memory operation is dependent on the first memory operation further comprises:

receiving a first register offset referenced by the first memory operation;

receiving a second register offset referenced by the second memory operation;

comparing the second register offset to the first register offset; and determining that the second register offset is the same as the first register offset.

6. The method of claim 1, wherein preventing the second memory operation from being scheduled until the first memory operation has been scheduled comprises:

dispatching the second memory operation with an indication that the second memory operation is waiting for the first memory operation to be scheduled.

7. The method of claim 1, further comprising:
scheduling the first memory operation; and
allowing the second memory operation to be scheduled in response to the scheduling of the first memory operation.

8. An apparatus comprising:
a dependency tracking structure configured to store a first addressing mode and a first base address source register referenced by a memory operation; and
dependency tracking circuitry configured to:

receive a second addressing mode and a second base address source register referenced by a second memory operation, determine whether the second addressing mode is the same as or different from the first addressing mode and whether the second base address source register is the same as or different from the first base address source register, and dispatch the second memory operation with a state qualifier that is based on whether the second addressing mode is the same as or different from the first addressing mode and whether the second base address source register is the same as or different from the first base address source register.

9. The apparatus of claim 8, wherein the dependency tracking structure is implemented using logic in a processor, the logic configured to track dependencies between memory operations.

10. The apparatus of claim 8, wherein:
the dependency tracking structure has a tracking entry, wherein the tracking entry includes a base address source register field that stores the first base address source register referenced by the first memory operation; and the dependency tracking circuitry is configured to determine whether the second base address source register is the same as or different from the first base address source register by comparing the second base address source register to the first base address source register that is stored in the address source register field of the tracking entry.

11. The apparatus of claim 8, wherein the dependency tracking circuitry is configured to:

determine that the second base address source register is different from the first base address source register; and dispatch the second memory operation with the state qualifier that allows the second memory operation to be scheduled.

12. The apparatus of claim 8, wherein the dependency tracking circuitry is configured to:

determine that the second addressing mode is the same as the first addressing mode and the second base address source register is the same as the first base address source register;

dispatch the second memory operation with the state qualifier that prevents the second memory operation from being scheduled; and change the state qualifier to allow the second memory operation to be scheduled in response to the first memory operation being scheduled.

13. The apparatus of claim 8, wherein the dependency tracking structure is further configured to:

store a first immediate offset referenced by the first memory operation;

receive a second immediate offset referenced by the second memory operation;

determine whether the second immediate offset is the same as or different from the first immediate offset; and dispatch the second memory operation with a state qualifier that is based on whether the second immediate offset is the same as or different from the first immediate offset.

14. The apparatus of claim 8, wherein the dependency tracking structure is further configured to:

store a first register offset referenced by the first memory operation;

receive a second register offset referenced by the second memory operation;

determine whether the second register offset is the same as or different from the first register offset; and dispatch the second memory operation with a state qualifier that is based on whether the second register offset is the same as or different from the first immediate offset.

15. A system comprising:

an instruction decode unit configured to decode instructions of a program into executable operations;

a dependency tracking unit configured to:
- receive the executable operations from the instruction decode unit, wherein the executable operations include a first memory operation that references a first addressing mode and a second memory operation that references a second addressing mode,
- detect whether a second memory operation is dependent on a first memory operation including determining whether the second addressing mode is the same as or different from the first addressing mode, and
- dispatch the second memory operation with a state qualifier based on whether the second memory operation is dependent on the first memory operation;

a schedule structure configured to receive the second memory operation with the state qualifier from the dependency tracking unit, and determine whether to schedule the second memory operation for execution based on the state qualifier; and a functional unit configured to execute the second memory operation when issued by the schedule structure.

16. The system of claim 15, wherein the dependency tracking unit is configured to detect whether the second memory operation is dependent on the first memory operation by comparing one or more address operands referenced by the second memory operation to one or more address operands referenced by the first memory operation, the second memory operation being dependent on the first memory operation when the one or more address operands referenced by the second memory operation are the same as the one or more address operands referenced by the first memory operation.

17. The system of claim 15, wherein the dependency tracking unit is configured to, in response to detecting that the second memory operation is not dependent on the first memory operation, dispatch the second memory operation to the schedule structure with the state qualifier that allows the second memory operation to be scheduled.

18. The system of claim 15, wherein the dependency tracking unit is configured to, in response to detecting that the second memory operation is dependent on the first memory operation:
- dispatch the second memory operation to the schedule structure with the state qualifier that prevents the second memory operation from being scheduled; and
- change the state qualifier in the schedule structure to allow the second memory operation to be scheduled in response to the first memory operation being scheduled by the schedule structure.

19. The system of claim 15, wherein the schedule structure is further configured to schedule the second memory operation when the state qualifier indicates that the second memory operation is allowed to be scheduled.

* * * * *